(12) United States Patent
Suo et al.

(10) Patent No.: US 11,959,744 B1
(45) Date of Patent: Apr. 16, 2024

(54) STEREOPHOTOGRAMMETRIC METHOD BASED ON BINOCULAR VISION

(71) Applicant: North China University of Science and Technology, Hebei (CN)

(72) Inventors: Yina Suo, Hebei (CN); Xuebin Ning, Hebei (CN); Fuxing Yu, Hebei (CN); Ran Wang, Hebei (CN)

(73) Assignee: North China University of Science and Technology, Tangshan (CN)

( * ) Notice: Subject to any disclaimer, the term of this patent is extended or adjusted under 35 U.S.C. 154(b) by 0 days.

(21) Appl. No.: 18/541,978

(22) Filed: Dec. 15, 2023

Related U.S. Application Data

(63) Continuation of application No. PCT/CN2023/104336, filed on Jun. 30, 2023.

(30) Foreign Application Priority Data

Apr. 27, 2023 (CN) .......................... 202310464266.0

(51) Int. Cl.
| | | |
|---|---|---|
| G01C 11/06 | (2006.01) |
| G01C 11/30 | (2006.01) |
| G06T 7/13 | (2017.01) |
| G06T 7/149 | (2017.01) |
| G06T 7/90 | (2017.01) |

(52) U.S. Cl.
CPC .............. *G01C 11/06* (2013.01); *G01C 11/30* (2013.01); *G06T 7/13* (2017.01); *G06T 7/149* (2017.01); *G06T 7/90* (2017.01)

(58) Field of Classification Search
CPC ........... G01C 11/06; G01C 11/30; G06T 7/13; G06T 7/149; G06T 7/90
See application file for complete search history.

(56) References Cited

U.S. PATENT DOCUMENTS

| | | | | |
|---|---|---|---|---|
| 2015/0042766 | A1* | 2/2015 | Ciurea | .................... G06T 15/20 |
| | | | | 348/48 |
| 2023/0343051 | A1* | 10/2023 | Rump | ..................... G06F 3/011 |

FOREIGN PATENT DOCUMENTS

| | | |
|---|---|---|
| CN | 110473217 A | 11/2019 |
| CN | 114255286 A | 3/2022 |

OTHER PUBLICATIONS

"Stereo matching algorithm based on multi-feature"—Journal of Shanghai University (Natural Science); Yu Huaibo et al., vol. 25, No. 1, Feb. 2019; p. 66-74.
"Stereo matching algorithm based on improved Census transform"—Electronic Measurement Technology; Zhang Jie et al., vol. 45, issue 23; Dec. 2022; p. 45-52.

* cited by examiner

*Primary Examiner* — Bobbak Safaipour

(57) ABSTRACT

Disclosed is a stereophotogrammetric method based on binocular vision, including the following steps: image acquisition, image correction and stereo matching are performed; cost matching and cost aggregation are performed on images of different sizes after correction; image segmentation is performed on the corrected image to determine edge pixel points of the object to be measured; and a pixel distance at an edge of the object to be measured is calculated to measure the size of the object. The method of the present invention enhances the matching accuracy of contour pixels of the object to be measured and improves the measurement accuracy.

5 Claims, 4 Drawing Sheets

STEREOPHOTOGRAMMETRIC METHOD BASED ON BINOCULAR VISION

CROSS-REFERENCE TO RELATED APPLICATIONS

This application is a continuation of PCT/CN2023/104336, filed Jun. 30, 2023 and claims priority of Chinese Patent Application No. 202310464266.0, filed on Apr. 27, 2023, the entire contents of which are incorporated herein by reference.

TECHNICAL FIELD

The present invention relates to the field of stereophotogrammetric survey, and particularly relates to a stereophotogrammetric method based on binocular vision.

BACKGROUND

In the industrial production process, it is vital to detect, record and control product parameters. Manual detection requires a lot of manpower in a long measurement period. For some products that are not easy to measure, there maybe exist potential risks to personal safety.

A method of acquiring three-dimensional information of a measured object can be divided into passive visual measurement and active visual measurement. For the passive vision measurement method, only images of the measured object need to be taken by use of a camera, without need of a special lighting projection device, and a relative position relationship between the measured object and the camera needs to be established, to acquire the three-dimensional information of the measured object. A distance measurement method based on binocular vision can not only accurately measure the size of an object, but also can be applied to a variety of environments, therefore, the research on the dimension measurement based on binocular vision is of great significance in research and application.

At present, in the field of stereophotogrammetric survey, a stereo matching algorithm is mainly used for stereo matching of the images taken by a binocular camera to acquire depth images, and then three-dimensional reconstruction is performed to measure the dimensions of an object. Some important stereo matching algorithms for measurement have been improved. For example, Hirschmüller, on the basis of combining the advantages and disadvantages of global stereo matching algorithms and local stereo matching algorithms, proposes a semi-global stereo matching algorithm SGM. Humenberger proposes a SGM-based method for calculating the cost by using Census transform and Hamming distance to reduce the time complexity and memory consumption of the algorithm. In view of the problem that a high-precision disparity map can not be acquired based on a single matching cost, Wang Yunfeng et al. combine the absolute difference (AD) cost with the Census cost to acquire a higher matching accuracy. However, the local stereo matching algorithms still have the deficiency of low matching accuracy, thus resulting in a large error in measuring the size of the object.

Technical Problems

In order to solve the problems involved in the Background, the present invention provides a stereophotogrammetric method based on binocular vision for measuring the size of the same object photographed by binocular photography equipment.

Technical Problems Solutions

A stereophotogrammetric method based on binocular vision, including the following steps:
1. the stereophotogrammetric method based on binocular vision, including the following steps:
   S1: using binocular cameras to shoot an object, acquiring images shot by the left and right cameras, and correcting images by using intrinsic and extrinsic parameters of the cameras, so that the images are corrected to be taken on the same plane;
   S2: performing down-sampling on the corrected images continuously to acquire images of different sizes;
   S3: performing stereo matching, and specifically performing cost matching and cost aggregation respectively on the images of different sizes obtained in the S2;
   performing cost matching, specifically fusing a pixel cost, a color cost and a gradient cost to acquire a matching cost of the images; and taking an average of an absolute value of a RBG difference of three color components of the images as the color cost, acquiring image gradient information by using the Sobel operator algorithm, and taking an average of an absolute value of an image gradient difference as the gradient cost;
   performing cost aggregation, specifically, adopting an aggregation strategy of minimum spanning tree and scanning line optimization for the cost obtained by cost matching for images of different sizes, and calculating and acquiring an initial disparity map of images of each size; and acquiring an optimal aggregation cost of the original size image according to a multi-size aggregation model;
   S4: performing disparity calculation and optimization on the acquired aggregation cost to acquire a disparity map;
   S5: performing image segmentation on the corrected images to determine edge pixel points of the object to be measured; and
   S6: according to a triangle measurement method, constructing a three-dimensional coordinate of the real world of the vertex by calculating a depth of the edge pixel points of the object to be measured and a distance between each vertex and the camera, so as to complete object dimension measurement.

Beneficial Effects:
   in the cost calculation stage, the image pixel cost is fused with the color cost and the gradient cost as the matching cost, which enhances the matching accuracy of contour pixels of the object to be measured; and
   in the cost aggregation stage, the minimum spanning tree and scanning line optimization aggregation are combined, and images of various sizes are used to acquire the aggregation cost for fusion, so that the acquired disparity map is more accurate and the object dimension measurement accuracy is higher.

THE BEST DESCRIPTION OF THE PRESENT INVENTION

Figure 1:
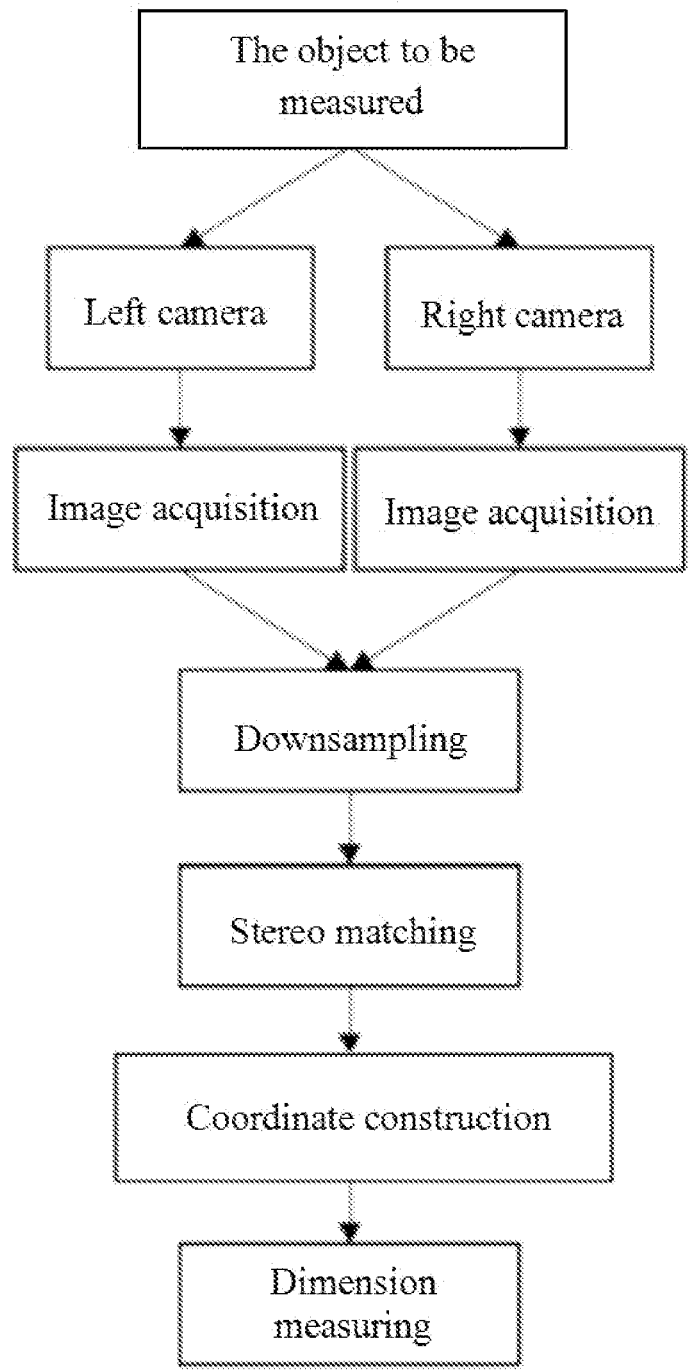
FIG. 1 is an overall flow chart of a measurement method of the present invention.

As shown in FIG. 1, according to the stereophotogrammetric method based on binocular vision of the present invention, several modules are configured, including an image acquisition module for image collection and correction through a calibrated binocular camera, a stereo matching module for pixel matching of corrected images, an image segmentation module capable of acquiring the contour of an object to be measured through segmentation of corrected images and determining the object contour by using a minimum quadrilateral frame, and an object dimension measurement module configured to acquire the quadrilateral coordinates of the contour of the object to be measured so as to acquire the real size of the object according to the disparity map acquired by stereo matching and image segmentation The specific steps of the method are as follows:

S1: in the image acquisition stage, calibrated binocular stereo vision cameras are used to shoot an object, and color images shot by the left and right cameras are acquired; according to the intrinsic and extrinsic parameters of the cameras acquired by camera calibration, the stereo correction and polar alignment are performed on the image to acquire a corrected image.

S2: the corrected images are down-sampled for four consecutive times, to zoom out the images while retaining some valid information, so as to acquire five images of different sizes.

Figure 2:
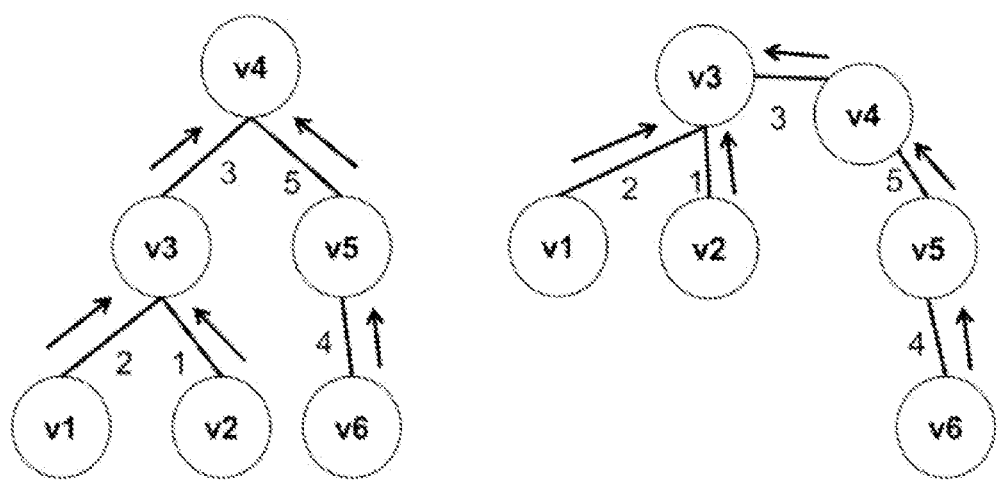
FIG. 2 is a diagram of bottom-up and top-down cost aggregation of a minimum spanning tree.
Figure 3:
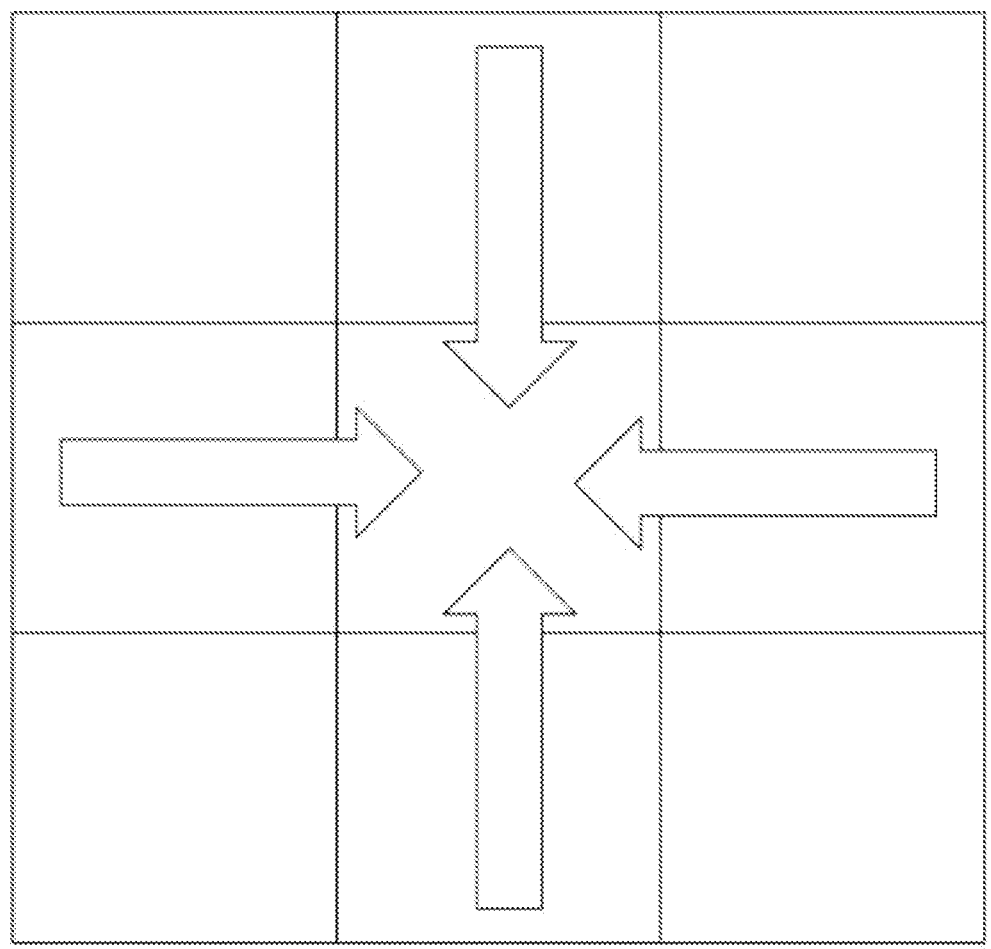
FIG. 3 is an aggregation direction of scanning line optimizing.

S3: stereo matching:

S3.1: in the cost calculation stage, the binocular image is converted into a gray scale image, and a 9×7 matching window is established with the pixel points to be matched on the gray scale image in the left map as the center. The two interval pixels in the upper, lower, left and right directions of the central pixel are averaged with the central pixel, and the maximum and minimum values are selected. Then, each pixel in the window is compared with the central pixel, the maximum and minimum values respectively, and finally the average cost is calculated and taken as an image pixel cost; according to the difference of a RGB trichromatic channel, trichromatic channel color information can be acquired based on a binocular image. The difference between the RGB values of the left map and the RGB values of the right map is calculated, the color threshold is set to 7 (when the difference between the colors is greater than 7, it is still taken as 7), and the average absolute value of the difference is taken as the color cost; the Sobel operator algorithm is used to acquire the image gradient information for the left and right maps respectively, the difference between the gradient values of the left map and the gradient values of the right map is calculated respectively, the gradient threshold is set to 2 (when the difference between the gradient difference is greater than 2, it is still taken as 2), and the average absolute value of the difference is taken as the gradient cost; the color cost and gradient cost are added with a weight value of 0.11:0.89 to acquire a joint cost. The pixel cost and the joint cost of images are fused by the method of normalized combination to acquire the cost matching cost; and S3.2, in the coat aggregation stage, according to the principle of minimum spanning tree, the image is regarded as a four-connected region, the weight value of an edge composed of two points of the image is the difference in the pixel gray value, and its value represents the similarity of adjacent pixels used to construct the minimum spanning tree. In view of the minimum spanning tree generated by the image, the aggregation method is shown in FIG. 2, and the minimum spanning tree on the left side of the image is subjected to bottom-up aggregation. Taking a node V4 as an example, to calculate the aggregate cost of the V4 node, the aggregate values of sub-nodes (V3, V4) and (V5, V4) and the product of their respective weight values can be directly calculated from the bottom layer of the minimum spanning tree until the root node. After bottom-up aggregation, top-down aggregation is needed. The minimum spanning tree on the right side of the image is subjected to top-down aggregation. Taking a node V3 as an example, it is assumed that V3 is the root node, and its parent node V4 is transformed into its child node, the aggregation cost of V3 node is calculated in the same way for the V4 aggregation cost, but the aggregation cost calculation of V3 node needs to add the product of the aggregation value of V4 node and its weight value, and the influence of V3 node has been considered for the aggregation value of V4 node. Therefore, it is necessary to subtract the aggregation value of V4 node by the aggregation value of V3 node, multiply the difference with the node weight value and add it with the V3 node cost as the V3 cost. For other nodes, the aggregation cost is calculated from top to bottom in turn, and the result is the final minimum spanning tree cost. After the minimum spanning tree aggregation is completed, in order to further alleviate the matching ambiguity, the scanning line optimization aggregation strategy is adopted for aggregation. The scanning line direction is shown in FIG. 3, the four scanning line optimizations are independent of each other, and the cost is aggregated from the top, bottom, left and right directions respectively; and finally, the average optimization cost in four directions is taken as the aggregate cost result.

S4: a disparity map is acquired: S3.1 and S3.2 steps are performed respectively with five images of different sizes to acquire the disparity map of each size; according to the multi-size aggregation model, the optimal aggregation cost of the original size image is acquired; and disparity calculation and optimization: the winner-take-all algorithm is used for the optimal aggregation cost, to determine the disparity value corresponding to the minimum cost of each pixel, and the initial disparity map is determined; the disparity map is optimized through consistency check, uniqueness detection and median filtering to acquire the optimal disparity map.

S5: image segmentation: the API of the Segment Anything algorithm is used to segment the image, and all masks of the image are acquired by using the mask_generator.generate ( ) function; the mouse is used to select the image to be measured, and the mask is selected according to the selected coordinate points to acquire the mask of the object to be measured. The smallest quadrilateral fitting is performed on a masked area of the object to be measured, to obtain the smallest quadrilateral vertex coordinates.

Figure 4:
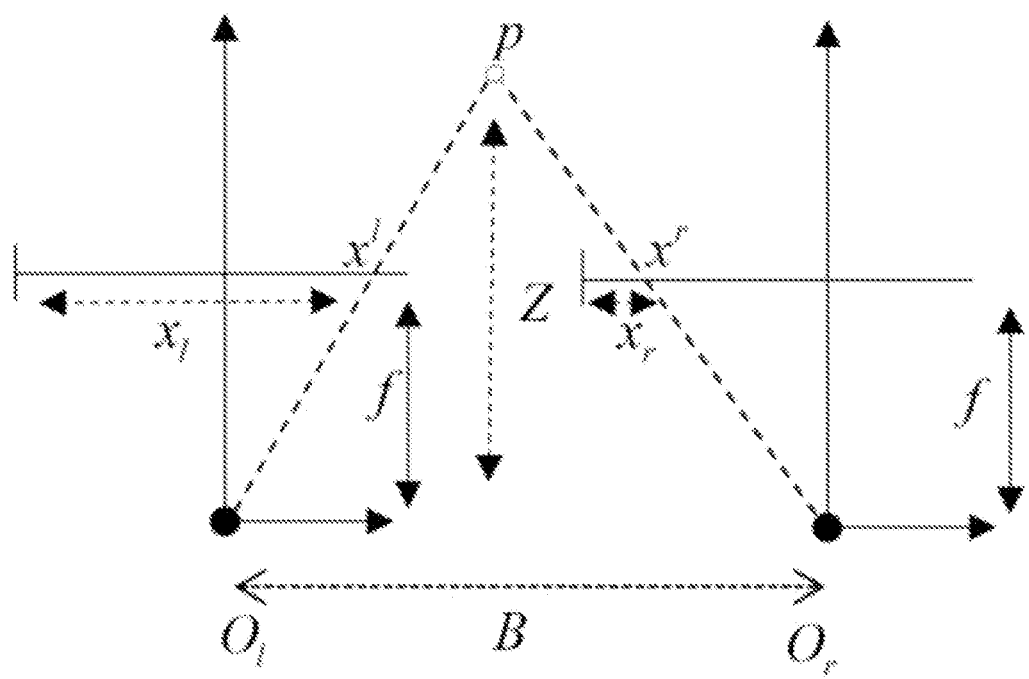
FIG. 4 is a principle diagram of trigonometric measurement.

S6. dimension measurement: according to a triangle measurement method, the depth of the edge pixels of the object to be measured is calculated. The principle is shown in FIG. 4, point P is a certain point on the object to be measured, $0_l$ and $0_r$ are the optical centers of the two cameras, respectively, the imaging points of point P on the camera photoreceptor of the two cameras are $X^l$ and $X^r$ respectively, $X_l$ and $X_r$ are the distances from the imaging points $X^l$ and $X^r$ to the left edges of their respective planes, f is the focal length of the camera, B is the center distance of the two cameras, and Z is the desired depth information; after correction, the two camera image planes are accurately located on the same plane, and the distance between the pixel point and the camera is $$Z = \frac{f \cdot B}{x_l - x_r}.$$

According to the smallest quadrilateral vertex coordinates of the object to be measured acquired in S5, the distance of each vertex from the camera is calculated, that is, the three-dimensional coordinate of each vertex in the real world is acquired. The Euclidean equation is used to calculate the real distance between the four vertexes, so as to realize the measurement of the object size.

INDUSTRIAL PRACTICABILITY

Through the above measurement method, the actual size of an object can be easily measured, and the method is widely applied to the field of industrial parts measurement and object measurement.

The invention claimed is:
1. A stereophotogrammetric method based on binocular vision, comprising the following steps:
S1: using binocular cameras to shoot an object, acquiring images shot by the left and right cameras, and correcting images by using intrinsic and extrinsic parameters of the cameras, so that the image are corrected to be taken on the same plane;
S2: performing down-sampling on the corrected images continuously to acquire images of different sizes;
S3: performing a stereo matching, and specifically performing cost matching and cost aggregation respectively on the images of different sizes obtained in the S2;
performing a cost matching, specifically fusing pixel cost, color cost and gradient cost to acquire matching cost of the images; and taking an average of an absolute value of a RBG difference of three color components of the images as the color cost, acquiring image gradient information by using the Sobel operator algorithm, and taking an average of an absolute value of an image gradient difference as the gradient cost;
performing a cost calculation, specifically, converting the binocular images into gray scale images, establishing a 9×7 matching window with pixel points to be matched on the gray scale image in the left map as a center, averaging two interval pixel points in the upper, lower, left and right directions of the central pixel point with the central pixel point respectively, selecting maximum and minimum values, then, comparing each pixel point in the window with the central pixel point, the maximum and minimum values respectively, and finally calculating and taking an average value of their cost as the image pixel cost; according to the difference of a RGB trichromatic channel, acquiring trichromatic channel color information of the binocular images, calculating a difference between RGB values of the left map and RGB values of the right map respectively, setting a color threshold to 7 (when the difference between the colors is greater than 7, it is still taken as 7), and taking an average absolute value of the difference as the color cost; acquiring the image gradient information for the left and right maps respectively using the Sobel operator algorithm, calculating the difference between gradient values of the left map and gradient values of the right map respectively, setting the gradient threshold to 2, taking the difference between the gradient differences greater than 2 as 2, and taking the average absolute value of the difference as the gradient cost; adding the color cost and gradient cost with a weight of 0.11:0.89 to acquire a joint cost, fusing the image pixel cost and the joint cost by a normalized combination method to acquire the matching cost; and fusion weight values of the image pixel cost and the joint cost are 15 and 35, respectively, a fusion formula is $C(p, d)=2-\exp(-C_{ns}(p, d)/35)-\exp(-C_{Comm}(p, d)/15)$, wherein $C_{ns}$ is the joint cost of the color cost and the gradient cost, and $C_{Comm}$ is the pixel cost; and
performing a cost aggregation, specifically, adopting an aggregation strategy of minimum spanning tree and scanning line optimization for the cost obtained by cost matching for images of difference sizes, and calculating and obtaining an initial disparity map of images of each size; and acquiring an optimal aggregation cost of the original size image according to a multi-size aggregation model;
S4: performing disparity calculation and optimization on the acquired aggregation cost to acquire a disparity map;
S5: performing image segmentation on the corrected images to determine edge pixel points of the object to be measured; and
S6: according to a triangle measurement method, constructing a three-dimensional coordinate of the real world of the vertex by calculating a depth of the edge pixel points of the object to be measured and a distance between each vertex and the camera, so as to complete object dimension measurement, with the steps of distance calculation of each vertex from the camera as follows: point P is a point on the object to be measured, $0_l$ and $0_r$ are optical centers of the two cameras, respectively, $X^l$ and $X^r$ are imaging points of point P on photo-receptors of the two cameras respectively, $X_l$ and $X_r$ are the distances from the imaging points $X^l$ and $X^r$ to the left edges of respective planes, respectively, f is a focal length of the camera, B is a center distances of the two cameras, and Z is desired depth information; after correction, the two camera image places are accurately located on the same plane; and acquiring the distance

$$Z = \frac{f \cdot B}{x_l - x_r}$$

between the pixel point and the camera using a triangle relationship; according to the smallest quadrilateral vertex coordinates of the object to be measured acquired in S5, calculating the distance of each vertex from the camera, that is, acquiring the three-dimensional coordinate of each vertex in the real world, and calculating a real distance between the four vertexes using the Euclidean equation, so as to realize the measurement of the size of the object.

2. The stereophotogrammetric method based on binocular vision according to claim 1, wherein in the S2, the corrected images are down-sampled for four consecutive times, to zoom out the images while retaining some valid information, so as to acquire five images of different size.

3. The stereophotogrammetric method based on binocular vision according to claim 1, wherein for the cost aggregation of the S3, using the minimum spanning tree to regard the image as a graph of a four-connected region, defining the weight value of the edge formed by the two pixel points as the gray difference of the pixel points, traversing the minimum spanning tree by bottom-up and top-down methods to acquire the minimum spanning tree aggregation cost; and then using the scanning line optimization aggregation strategy from different directions of the image sequentially to determine the aggregation cost of the current pixel by the aggregation cost of the previous pixel, and finally, acquiring the optimal aggregation cost of the original size image by using the aggregation cost of images of each size.

4. The stereophotogrammetric method based on binocular vision according to claim 1, wherein for the disparity calculation in the S4, selecting the disparity value corresponding to the minimum aggregation cost of each pixel as the final disparity, performing the disparity optimization through the consistency check, uniqueness detection and median filtering methods, wherein, the consistency check is used to check the inconsistent pixels in the disparity map, the uniqueness detection is performed to detect the non-unique pixels in the disparity map, and the median filtering is used to smooth the noise in the disparity map.

5. The stereophotogrammetric method based on binocular vision according to claim 1, wherein in the S5, performing the image segmentation on the corrected image by using image segmentation technology to acquire contour information of the object to be measured, using the smallest quadrilateral to frame the contour of the object, and acquiring the coordinates of the four vertexes of the quadrilateral.

\* \* \* \* \*